US012434853B2

(12) United States Patent
Barrientos et al.

(10) Patent No.: US 12,434,853 B2
(45) Date of Patent: Oct. 7, 2025

(54) STOWAWAY INCEPTOR AND METHODS THEREOF

(71) Applicant: Supernal, LLC, Washington, DC (US)

(72) Inventors: Matthew Barrientos, Aliso Viejo, CA (US); Alexander Pozzi, Carlsbad, CA (US)

(73) Assignee: Supernal, LLC, Irvine, CA (US)

( * ) Notice: Subject to any disclaimer, the term of this patent is extended or adjusted under 35 U.S.C. 154(b) by 0 days.

(21) Appl. No.: 18/606,254

(22) Filed: Mar. 15, 2024

(65) Prior Publication Data

US 2024/0308640 A1 Sep. 19, 2024

Related U.S. Application Data

(60) Provisional application No. 63/490,404, filed on Mar. 15, 2023.

(51) Int. Cl.
| | |
|---|---|
| *B64D 43/00* | (2006.01) |
| *B64C 1/14* | (2006.01) |
| *G05G 9/047* | (2006.01) |

(52) U.S. Cl.
CPC ............ *B64D 43/00* (2013.01); *B64C 1/1407* (2013.01); *G05G 9/047* (2013.01); *G05G 2009/04703* (2013.01)

(58) Field of Classification Search
CPC ....... B64D 43/00; B64C 13/042; B64C 27/56; B64C 1/1407; B60R 2011/0082; B60R 7/046; B60R 2011/0021; B60R 2011/0094; G05G 9/047; G05G 2009/04703
See application file for complete search history.

(56) References Cited

U.S. PATENT DOCUMENTS

| | | | | |
|---|---|---|---|---|
| 5,845,735 | A * | 12/1998 | Muller | B62D 1/12 180/323 |
| 6,789,831 | B2 * | 9/2004 | Schmidt | B60K 35/10 296/37.13 |
| 2007/0204718 | A1 * | 9/2007 | Strait | G05G 5/06 74/523 |
| 2011/0163206 | A1 * | 7/2011 | Bandera | B64C 13/06 244/234 |
| 2019/0367072 | A1 * | 12/2019 | Hansen | G05D 1/021 |
| 2022/0009541 | A1 * | 1/2022 | Bowen | B62D 1/183 |

* cited by examiner

*Primary Examiner* — Joshua D Huson
*Assistant Examiner* — Peter A Taraschi
(74) *Attorney, Agent, or Firm* — Bookoff McAndrews, PLLC

(57) ABSTRACT

A vehicle is provided. The vehicle may include: a cockpit including a cabin door; an inceptor, positioned on the cabin door, including at least a base portion and a controller portion; and a transition mechanism integrated into the cabin door that enables adjustment of the inceptor between a first configuration and a second configuration; wherein at least the controller portion of the inceptor is positioned outside of the cabin door in the first configuration; wherein the base portion and the controller portion of the inceptor are fully contained within a recess of the cabin door in the second configuration. Other aspects are described and claimed.

20 Claims, 3 Drawing Sheets

STOWAWAY INCEPTOR AND METHODS THEREOF

CROSS REFERENCE TO RELATED APPLICATIONS

This application claims priority to U.S. Provisional Application No. 63/490,404 filed Mar. 15, 2023, which is incorporated by reference herein in its entirety.

TECHNICAL FIELD

Aspects of the present disclosure relate generally to techniques for adjusting a configuration of an inceptor in an aircraft and, more particularly, to techniques for transitioning the inceptor between a stowed configuration and a deployed configuration.

BACKGROUND

Commonly referred to as "sticks," inceptors cover a variety of pilot control devices on fixed- and rotary-wing aircraft including side sticks, center sticks, throttles, cyclics, collective levers, and the like. On aircraft containing fly-by-wire (FBW) systems (i.e., those fight control systems that utilize computers to process the flight control inputs made by the pilot), the inceptors transmit pilot inputs to the flight control computer, which translates them instantaneously to commands that adjust directional surfaces and power. Depending on the mounting location of the inceptor (e.g., down on the aircraft floor, on the doors, etc.), the pilot cabin may become crowded, which may correspondingly make ingress and egress to and from the cabin burdensome.

The present disclosure is accordingly directed to improved inceptor configurations and mounting methods that enable the inceptors to be stowed away when not in use. These improved inceptors may correspondingly increase freedom of movement in the cabin, particularly during ingress/egress. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, a stowaway inceptor is disclosed.

In one aspect, a vehicle is provided. The vehicle includes: a cockpit including a cabin door; an inceptor, positioned on the cabin door, including at least a base portion and a controller portion; and a transition mechanism integrated into the cabin door that enables adjustment of the inceptor between a first configuration and a second configuration; wherein at least the controller portion of the inceptor is positioned outside of the cabin door in the first configuration; wherein the base portion and the controller portion of the inceptor are fully contained within a recess of the cabin door in the second configuration.

In another aspect, a method of adjusting an inceptor positioned on a cabin door of a vehicle between a first configuration and a second configuration is provided. The method includes: receiving, at a transition mechanism of the inceptor, an indication to initiate an adjustment to a configuration of the inceptor; and facilitating, based on the receiving, the adjustment; wherein the inceptor comprises a controller portion and a base portion; wherein at least the controller portion of the inceptor is positioned outside of the cabin door in the first configuration; wherein the base portion and the controller portion of the inceptor are fully contained within a recess of the cabin door in the second configuration.

In yet another aspect, a cabin door assembly is provided. The cabin door assembly, includes: a cabin door; an inceptor integrated into the cabin door including at least a base portion and a controller portion; and a transition mechanism integrated into the aircraft cabin door that enables adjustment of the inceptor between a first configuration and a second configuration; wherein at least the controller portion of the inceptor is positioned outside of the cabin door in the first configuration; wherein the base portion and the controller portion of the inceptor are fully contained within a recess of the cabin door in the second configuration.

In yet another aspect, an inceptor is provided. The inceptor, includes: a base portion; a controller portion attached to the base portion; a plurality of buttons positioned around the controller portion; and a transition mechanism enabling adjustment of the inceptor between a first configuration and a second configuration; wherein the controller portion and the plurality of buttons are active in the first configuration and are inactive in the second configuration.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate the disclosed embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure. In the drawings.

DETAILED DESCRIPTION OF THE EMBODIMENTS

Figure 1:
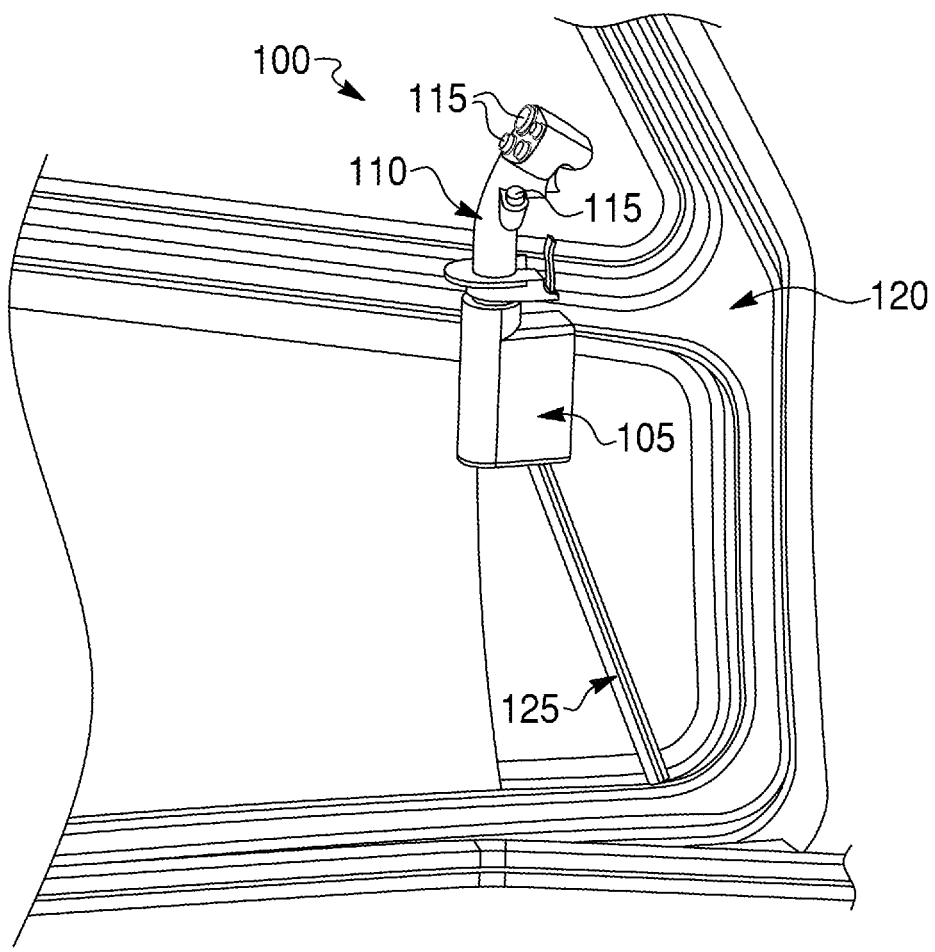
FIG. 1 depicts a stowaway inceptor in a first configuration, according to various aspects of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this disclosure, the term "based on" means "based at least in part on." The singular forms "a," "an," and "the" include plural referents unless the context dictates otherwise. The term "exemplary" is used in the sense of "example" rather than "ideal." The terms "comprises,"

"comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value. In addition, the term "between" used in describing ranges of values is intended to include the minimum and maximum values described herein. The use of the term "or" in the claims and specification is used to mean "and/or" unless explicitly indicated to refer to alternatives only or the alternatives are mutually exclusive, although the disclosure supports a definition that refers to only alternatives and "and/or." As used herein "another" may mean at least a second or more.

As used herein, the term "vehicle" may refer to any type of vehicle, e.g., motor vehicles (e.g., cars, trucks, buses, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like. Various embodiments of the present disclosure relate generally to electric vehicles, such as vehicles driven via one or more electric loads, components associated with the electrical loads, and monitoring systems for the electrical loads and/or the components associated with the electrical loads. The electric loads may be in the form of electric motors associated with one or more propellers of a vertical takeoff and landing vehicle.

Aircraft cabins, particularly those equipped with FBW systems, grapple with challenges related to the placement and utilization of inceptors such as side sticks, center sticks, throttles, and cyclics. These inceptors are essential for transmitting pilot inputs to flight control computers, thereby facilitating real-time adjustments to directional surfaces and power.

A variety of smaller types of aircraft exist that may be utilized to quickly and conveniently ferry passengers and objects between locations. One such aircraft, for example, is an electric vertical take-off and landing (eVTOL) vehicle. These aircraft, like many others, are conventionally controlled by inceptors that are mounted down to the aircraft floor or positioned on the flight deck. Some aircraft have adopted "sidestick" configurations, in which the inceptor(s) are mounted to a portion of the cabin side wall. In these configurations, cabin ingress/egress is generally achieved either via an exit in the rear area of the cockpit or via a climb-out hatch. In a side egress cabin (e.g., via an exit through a cabin side door), sidestick inceptors may impede exit and/or entry. The conventional mounting of inceptors, whether on the aircraft floor, doors, or other fixed locations, has resulted in restricted cabin spaces, which may hinder seamless ingress and egress for pilots.

Accordingly, a need exists for an inceptor configuration that may be conventionally operable during use but that also may be stowed away during periods of non-use. Such a configuration may enable unimpeded ingress/egress to and from an aircraft cabin and may also ensure that the inceptor is protected from the elements when the cabin side doors are opened.

Reference will now be made in detail to the exemplary embodiments of the present disclosure described below and illustrated in the accompanying drawings. Wherever possible, the same reference numbers will be used throughout the drawings to refer to same or like parts.

Additional objects and advantages of the embodiments will be set forth in part in the description that follows, and in part will be obvious from the description, or may be learned by practice of the embodiments. It is to be understood that both the foregoing general description and the following detailed description are exemplary and explanatory only and are not restrictive of the claims.

Referring now to FIG. 1, an exemplary inceptor 100 ("inceptor") is provided. Inceptor 100 is a cockpit control that may be utilized by a user to control the movement and/or other functionalities of a vehicle. For simplicity purposes, the vehicle in the remaining disclosure described herein, and the figures associated therewith, is an electric powered VTOL aircraft. However, such a designation is not limiting and the concepts described herein may be applicable to virtually any type of vehicle, e.g., motor vehicles (e.g., cars, trucks, buses, motorcycles, etc.), railed vehicles (e.g., trains, etc.), amphibious vehicles (e.g., boats, etc.), aircraft (e.g., planes, helicopters, etc.), spacecraft, autonomous or semi-autonomous vehicles, and the like.

In an embodiment, inceptor 100 may contain base portion 105, joystick control 110, and plurality of action buttons 115 positioned thereon. In the associated figures and the following description, inceptor 100 is illustrated as being door-mounted, i.e., mounted to the side of one or more aircraft cabin doors (e.g., a sliding door, pocket door, swingout door, gullwing door, etc.). It is important to note, however, that the illustrated inceptor design and the mounting location are not limiting. More particularly, the embodiments described herein may be applicable to virtually any type of inceptor and may also be applicable to an inceptor mounted to virtually any other location within the vehicle cabin (e.g., cabin floor, cabin ceiling, an interior cabin wall, etc.).

In an embodiment, inceptor 100 may be hard-wired into the aircraft. More particularly, one or more wires may run from a central aircraft system to inceptor 100 via cabin door 120 to enable signal transfer. In another embodiment, inceptor 100 may communicate with the central aircraft system through wireless means, e.g., via a wireless communication modality such as BLUETOOTH, near field communication (NFC), and the like. In such an embodiment, the inceptor(s) may be decoupled from its mounted position and operated remotely. For instance, the inceptor may be a remote controller that can be attached to one or more predetermined areas within the cabin (e.g., via magnetic attachment, etc.) and, if desired by the user, subsequently detached therefrom. The user may utilize the detached inceptor in the same way that they would utilize the mounted inceptor. In yet another embodiment, a hybrid configuration may exist in which some portions of inceptor 100 are hard-wired into the aircraft whereas others may operate wirelessly. For example, base portion 105 of inceptor 100 may be integrated with the aircraft but controller portion 110 may be detachable. In such an embodiment, a rechargeable battery (e.g., a lithium-ion battery, etc.) of controller portion 110 may automatically charge when controller portion 110 is docked with base portion 105. Additionally or alternatively, upon re-docking with base portion 105, any controller or system updates that may have occurred while controller portion 110 was undocked from base portion 105 may be transmitted to controller portion 110.

Figure 2:
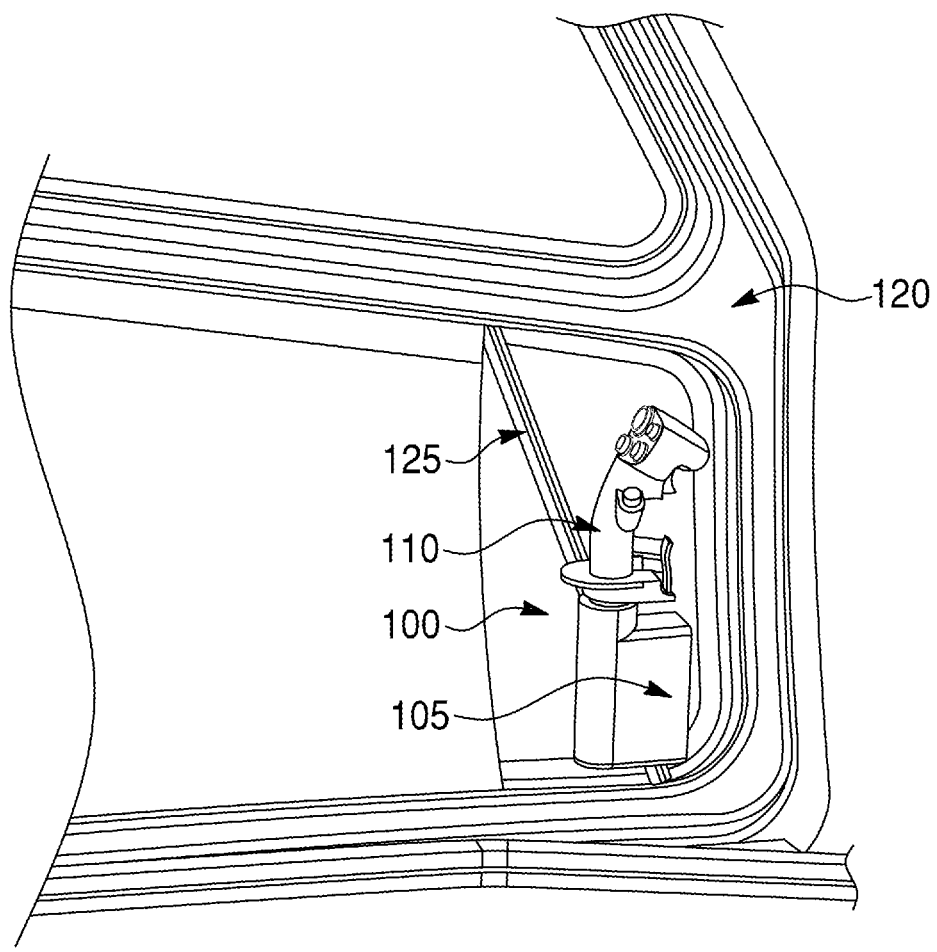
FIG. 2 depicts the stowaway inceptor from FIG. 1 in a second configuration, according to various aspects of the present disclosure.

In an embodiment, inceptor 100 illustrated in FIG. 1 is presented in a first configuration. Inceptor 100 may be adjusted between the first configuration and a second configuration via utilization of a transition mechanism. In an embodiment, inceptor 100 in the first configuration may be considered to be in a "deployed" configuration, i.e., a configuration in which it is ready for use by the pilot, whereas inceptor 100 in the second configuration may be considered to be in a "stowed" configuration, i.e., a configuration in which it is contained within a recess of a cabin door). In an embodiment, one type of transition mechanism may be a sliding mechanism by which inceptor 100 may slide up and down track 125 integrated into a portion of cabin door 120. For instance, inceptor 100 may transition from the deployed configuration presented in FIG. 1 to a stowed configuration, as illustrated and presented in FIG. 2, via horizontal movement down track 125.

Figure 3:
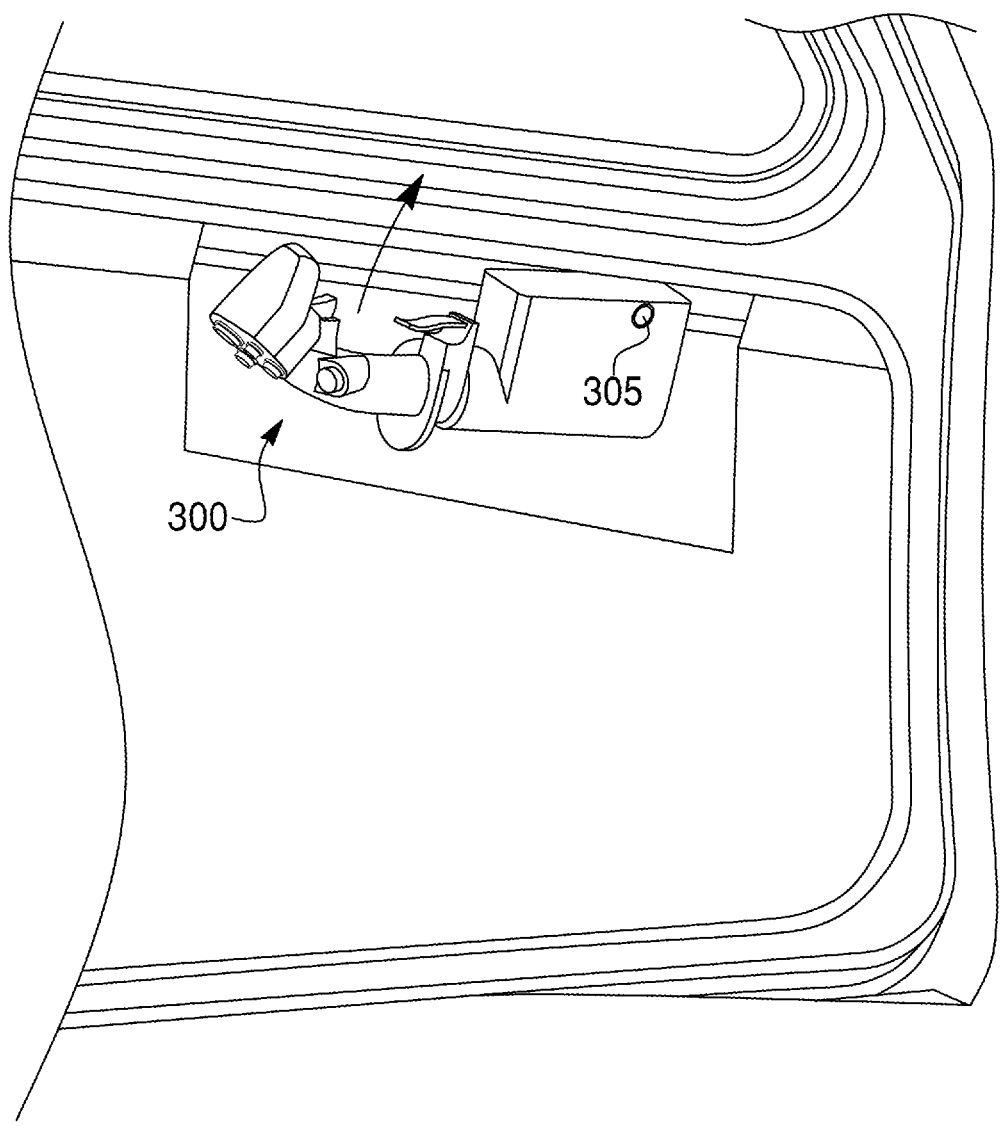
FIG. 3 depicts a stowaway inceptor in a second configuration according to another embodiment, according to various aspects of the present disclosure.

Referring now to FIG. 3, in another embodiment, a rotational mechanism is presented by which inceptor 300 may rotate about hinge point 305 to stow and deploy. More particularly, inceptor 300 in FIG. 3 is illustrated in a stowed configuration but may rotate about the hinge point as indicated to transition into the deployed configuration. In an embodiment, two or more transition mechanisms may be applicable to a single inceptor. For instance, a user may initially rotate an inceptor down within a recess of the cabin door 120, as illustrated in FIG. 3, and thereafter slide it further into the cabin door 120 along a track (e.g., via manual interaction, via interaction with a button, etc.), such as the one illustrated in FIGS. 1-2.

In an embodiment, the transitions described above may be instituted manually (e.g., via manual user adjustment, etc.). For instance, a user may manually interact with inceptor 100 to place it into the stowed configuration (e.g., a pilot may push a sliding mechanism-based inceptor down along the provided track 125 into the recess of the cabin door 120). As another example, a user may press, or press and hold, a button (e.g., positioned close to the inceptor location) that may be used to deploy and/or stow the inceptor (e.g., via utilization of a spring system, etc.). In another embodiment, the transition may be facilitated automatically, without additional user input. For example, the action of opening and closing the cabin door may dynamically actuate an inceptor to deploy or stow (e.g., opening a cabin door may automatically stow an inceptor and closing the cabin door may automatically deploy it, etc.). Additionally or alternatively, in another example, a flight control system of the aircraft may receive a signal indication that the aircraft has initiated flight systems and/or is about to take off and therefore correspondingly transmits an instruction to deploy the inceptor from its stowed configuration. In the alternative, the flight control system may detect that an aircraft has just landed and that the pilot will soon exit the cabin door and so then may dynamically initiation operations to stow the inceptor.

In an embodiment, certain functions of the aircraft may be disabled if an inceptor is not deployed or stowed. For instance, the aircraft may be apprised of current weather conditions (e.g., via sensors resident on the aircraft, by information obtained from a weather monitoring agency, etc.). Responsive to determining that adverse conditions (e.g., rain, snow, etc.) are present in the area of aircraft operation, the system may prevent the pilot from opening a cabin door unless the inceptor is maneuvered into a stowed configuration. In another embodiment, as a safety feature, all inceptors may initially be in a stowed configuration. To deploy them, the pilot must provide some type of indication that they are authorized to fly the aircraft. For instance, the pilot may be required to enter a passcode, undergo biometric authentication (e.g., via fingerprint analysis, facial recognition, etc.), and the like. Responsive to authenticating the pilot, the appropriate inceptor(s) may deploy. Conversely, if the pilot is unable to be authenticated, then the aircraft may prevent access to certain flight functions. Additionally or alternatively, a notification may be sent to one or more designated entities informing them of the failed authentication event (e.g., the aircraft owner, a law enforcement agency, an aviation administrator, etc.).

In an embodiment, two or more inceptors may exist within a single aircraft. For example, the aircraft cabin may contain two cabin side doors and each of the cabin side doors may contain a mounted inceptor. In such a situation, one inceptor may be fixed in place and the other inceptor may be adjustable between a deployed configuration and a stowed configuration using the techniques described above. For instance, an inceptor positioned on a smaller and/or less frequently used cabin door (e.g., a cabin door designated for emergency egress only, etc.) may be fixed in place whereas another inceptor positioned on a primary exit door may be adjustable. Alternatively, in another embodiment, either of the inceptors may be adjustable between the deployed and stowed configurations. In yet another embodiment, an external remote controller inceptor may also exist that is operable by an individual located outside of the aircraft. The external remote control inceptor may take operational command of the aircraft in certain situations (e.g., upon receipt of a distress call by the pilot, upon receipt of an alert signal from the aircraft system, etc.). In this situation, the interior aircraft inceptors may automatically stow, preventing the pilot from continuing to fly, and full flight control may be transferred to the external remote control inceptor.

In an embodiment, when two inceptors are present and both are deployed, each of the inceptors may have a subset of capabilities that, when utilized together, are able to control all necessary aircraft functions. In such an embodiment, when one of the inceptors is stowed away and the other remains deployed during aircraft operation, the capabilities of the stowed inceptor may be transferred to the deployed inceptor, which may correspondingly manifest full aircraft control. In another embodiment, each inceptor may be assigned a control designation (e.g., primary control, secondary control, etc.). The control designation may be assigned based on inceptor position (e.g., left cabin door inceptor is the primary control and right cabin door is the secondary control, etc.) or by an operating individual (e.g., if two pilots are present in a cabin cockpit, the inceptor associated with the more senior pilot may be the primary and the inceptor associated with the junior pilot may be the secondary, etc.). In a situation where the primary inceptor is stowed, the secondary inceptor may automatically be assigned full aircraft control. Upon deployment of the primary inceptor, full aircraft control may be automatically transferred away from the secondary inceptor and assigned to the primary inceptor.

The many features and advantages of the present disclosure are apparent from the detailed specification, and thus, it is intended by the appended claims to cover all such features and advantages of the present disclosure that fall within the true spirit and scope of the disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. A vehicle, comprising:
    a cockpit including a cabin door;
    an inceptor, positioned on the cabin door, including at least a base portion and a controller portion; and
    a transition mechanism integrated into the cabin door that enables adjustment of the inceptor between a first configuration and a second configuration, wherein the transition mechanism is configured to facilitate the adjustment of the inceptor between the first configuration and the second configuration automatically in response to detecting an occurrence of a predetermined event;
    wherein at least the controller portion of the inceptor is positioned outside of the cabin door in the first configuration;
    wherein the base portion and the controller portion of the inceptor are fully contained within a recess of the cabin door in the second configuration.

2. The vehicle of claim 1, wherein the transition mechanism is a slide mechanism including a track.

3. The vehicle of claim 1, wherein the inceptor is configured to translate on a track during adjustment between the first and second configurations.

4. The vehicle of claim 1, wherein the transition mechanism is a rotational mechanism comprising a hinge.

5. The vehicle of claim 1, wherein the inceptor is configured to rotate about a hinge during adjustment between the first and second configurations.

6. The vehicle of claim 1, wherein the inceptor is connected to an aircraft control system via one or more wires that run at least partially through the cabin door.

7. The vehicle of claim 1, wherein the inceptor is a detachable device in which at least the controller portion is detachable from the cabin door.

8. The vehicle of claim 1, wherein the controller portion is communicable with an aircraft control system via a wireless communication modality.

9. The vehicle of claim 1, wherein the cabin door includes a first cabin door and a second cabin door and wherein the inceptor includes a first inceptor positioned on the first cabin door and a second inceptor positioned on the second cabin door.

10. The vehicle of claim 1, wherein the transition mechanism is configured to deploy or stow the inceptor automatically upon occurrence of a predetermined event.

11. A method of adjusting an inceptor positioned on a cabin door of a vehicle between a first configuration and a second configuration, the method comprising:
    receiving, at a transition mechanism of the inceptor, an indication to initiate an adjustment to a configuration of the inceptor, wherein the receiving the indication includes detecting an occurrence of a predetermined event; and
    facilitating, based on the receiving, the adjustment automatically responsive to the detecting;
    wherein the inceptor comprises a controller portion and a base portion;
    wherein at least the controller portion of the inceptor is positioned outside of the cabin door in the first configuration;
    wherein the base portion and the controller portion of the inceptor are fully contained within a recess of the cabin door in the second configuration.

12. The method of claim 11, wherein the indication is derived from a manual input of a user, wherein the manual input corresponds to an actuation of a transition mechanism adjustment button.

13. The method of claim 11, wherein the predetermined event is one of a cabin door opening event and/or a cabin door closing event;
    wherein the facilitating the adjustment comprises:
        adjusting the inceptor to the first configuration in response to the cabin door closing event; and
        adjusting the inceptor to the second configuration in response to the cabin door opening event.

14. The method of claim 11, wherein the predetermined event is one of an aircraft initiation event and an aircraft shut down event;
    wherein the facilitating the adjustment comprises:
        adjusting the inceptor to the first configuration in response to the aircraft initiation event; and
        adjusting the inceptor to the second configuration in response to the aircraft shut down event.

15. The method of claim 11, wherein the predetermined event is an authorization confirmation event;
    wherein the facilitating the adjustment comprises adjusting the inceptor to the first configuration in response to the authorization confirmation event.

16. The method of claim 11, wherein the predetermined event is an adverse weather detection event;
    wherein the facilitating the adjustment comprises adjusting the inceptor to the second configuration during a duration of adverse weather associated with the adverse weather detection event.

17. A cabin door assembly, comprising:
    a cabin door;
    an inceptor integrated into the cabin door including at least a base portion and a controller portion; and
    a transition mechanism integrated into the cabin door that enables adjustment of the inceptor between a first configuration and a second configuration, wherein the transition mechanism is configured to facilitate the adjustment of the inceptor between the first configuration and the second configuration automatically in response to detecting an occurrence of a predetermined event;
    wherein at least the controller portion of the inceptor is positioned outside of the cabin door in the first configuration;
    wherein the base portion and the controller portion of the inceptor are fully contained within a recess of the cabin door in the second configuration.

18. The cabin door assembly of claim 17, wherein the cabin door is selected from the group consisting of: a sliding door, a pocket door, a swingout door, and a gullwing door.

19. The cabin door assembly of claim 17, wherein the transition mechanism is one of a slide mechanism including a track or a rotational mechanism including a hinge.

20. The method of claim 11, further comprising:
    detecting a distress condition associated with the vehicle; and
    transferring flight control from the inceptor to a remote external inceptor located outside of the vehicle.

* * * * *